UNITED STATES PATENT OFFICE.

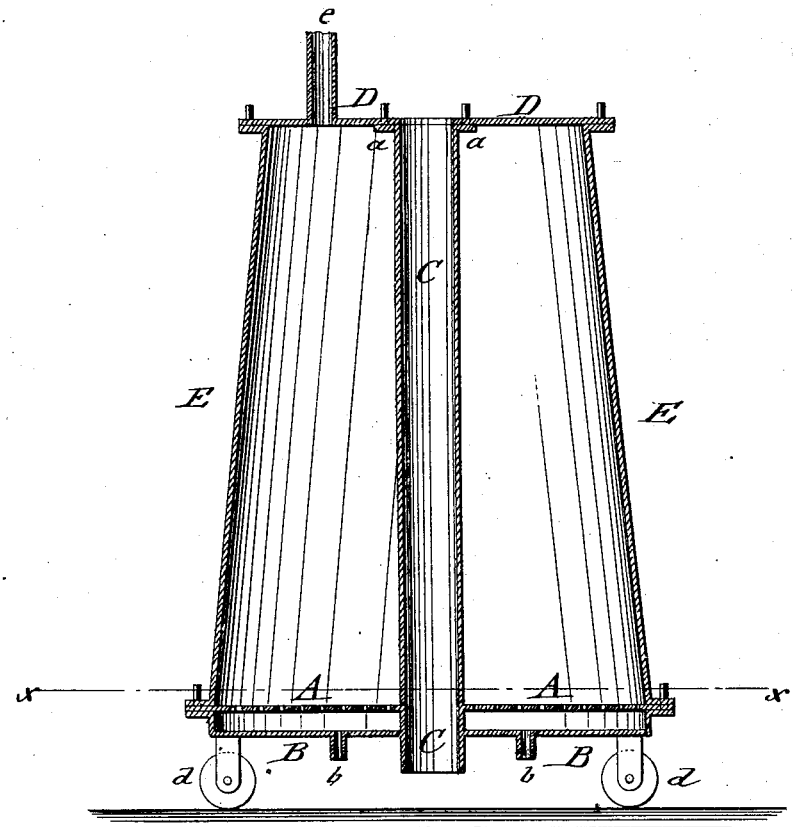
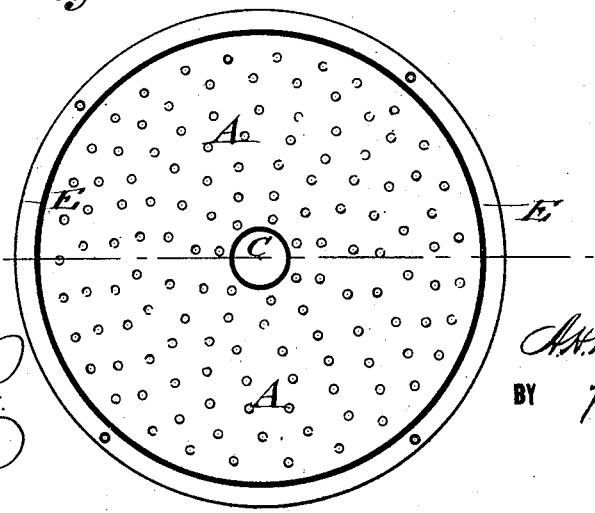

A. H. WILLIAM SCHRADER, OF HOBOKEN, NEW JERSEY.

IMPROVEMENT IN MOLDS FOR SUGAR.

Specification forming part of Letters Patent No. 155,263, dated September 22, 1874; application filed July 18, 1874.

*To all whom it may concern:*

Be it known that I, A. H. WILLIAM SCHRADER, of Hoboken, in the county of Hudson and State of New Jersey, have invented a new and Improved Mold for Sugar, of which the following is a specification:

In the accompanying drawing, Figure 1 represents a vertical central section of my improved tank or mold for purging sugar, taken on the line $c\ c$, Fig. 2; and Fig. 2 a horizontal section of the same on the line $x\ x$, Fig. 1.

Similar letters of reference indicate corresponding parts.

The object of my invention is to furnish for sugar-refineries an improved tank or mold of sufficient size to take up for purging and drying either a fractional part or the whole of the vacuum-pan, according to the size of the same, so as to expedite and facilitate the purging, crystallizing, and cutting of the sugar, and allow the working off of larger quantities of sugar than with the methods hitherto employed.

The invention will first be fully described, and then pointed out in the claim.

In the drawing, A represents the perforated false bottom of my improved tank or mold for purging and drying larger quantities of sugar. The false bottom is arranged about three-fourths of an inch, more or less, from the true bottom B, and made strong enough to sustain a pressure of from sixty to one hundred pounds per square inch. A pipe, C, passes through central perforations of both bottoms, being equal in width to about one-fourth of their diameter, and reaches within about two inches of the ground. Pipe C is firmly riveted or otherwise fastened to the false bottom, and extended in vertical direction to the straight or convex detachable top D of the tank, to which it is firmly attached by a flange with suitable bolts and intermediate packing. The true bottom B connects to the outside by a suitable number of short pipes, $b$, that may be readily opened or closed in some suitable manner. A series of supporting-stays may be applied to the true bottom, and, together with the central pipe, placed on wedge-pieces for giving sufficient strength to the lower part of the tank for resisting the pressure required in the purging operations. The central pipe C serves for the double purpose of giving a strong and rigid support to the whole tank and ventilating and cooling the interior of the sugar, so as to cause a quicker and more regular crystallization. The loss of space in the tank is made up by an increase in the diameter of same. The bottom B is further placed on wheels $d$, by which the whole tank may be readily moved from place to place, as necessary, in the different operations. The body E of the tank is made of slightly conical shape, and applied detachably to the bottom and top by top and bottom flanges, suitable fastening-screws, and interposed packing. The conical shape admits of the lifting off of the body after crystallization. The top or cover D of the tank is connected, by a pipe, $e$, with the air-forcing pump, and may also be braced by suitable bars from above for resisting the great strain exerted thereon during the purging. The body E may, however, be also made stationary to the bottom part, and of cylindrical shape, in which case suitable man-holes near the bottom have to be provided for removing the sugar. The body of the tank might also be constructed of several parts held together by hoops, though this is not as advantageous as the detachable or stationary construction.

The size of the tank is intended to be in proportion to the vacuum-pan, large enough to hold one-third, one-half, or the whole of the contents of the same, besides all the deck-liquor, (concentrated solution of white sugar,) and a space above the same of about one-fifth of the contents of the tank for the compressed air.

The conical detachable tank is mainly intended for the production of cut loaf-sugar, after the mixture of sugar and molasses has passed through the vacuum-pan, in which the sugar is treated in the same way as is now done for hard loaf-sugar. The bottom pipes of the tank are closed and the sugar mass then put in the tank and left to cool off to a certain point. The tank is then removed to the molasses-room, placed over a pan that has connection with two molasses-tanks in order to keep the first drippings separate from the last. As soon as the sugar is sufficiently crystallized the crust on top is cut open with a small rake and the deck-liquor poured on the open pores of the top part. The bottom pipes are then opened, the cover laid on and tightly fastened with stays, as well as the bottom and central pipe. The air force-pump is then put in operation at suitable intervals until the sugar has been entirely purged from the molasses. The tank is then removed on the track to the drying-room, in which pure warm air is pumped through until the whole is dry and hard. The tank is next opened and the cover and body raised by a derrick or other hoisting apparatus, so that the crystallized body of sugar may be, by placing the bottom on a turn-table, fed to the saws of a suitable cutting-machine to be cut up directly into blocks or pieces of the required size. The bottoms are then cleaned and prepared for the next operation.

Soft sugar and granulated sugar may be made in the tank with body attached stationary to the bottom part, the latter being cooled with the intention of getting large crystals, and not a hard loaf, which process is well known to pan-men, and produces a mass that crumbles easily for being readily removed through the man-holes.

Having thus described my invention, I claim as new and desire to secure by Letters Patent—

The mold E, with top, body, and double bottom detachable, the inner bottom being perforated, and an air-passage, C, being made through the center for the purpose of cooling the sugar during the process of crystallization, substantially as shown and described.

A. H. WILLIAM SCHRADER.

Witnesses:
PAUL GOEPEL,
T. B. MOSHER.